United States Patent
Hrovath et al.

(10) Patent No.: US 6,925,764 B2
(45) Date of Patent: Aug. 9, 2005

(54) TILE

(76) Inventors: Josef Hrovath, St. Leonhard 22, A-9587, Riegersdorf (AU); Hugo Lenhard-Backhaus, Baumannstrasse 6/3, A-1030, Vienna (AU)

( * ) Notice: Subject to any disclaimer, the term of this patent is extended or adjusted under 35 U.S.C. 154(b) by 0 days.

(21) Appl. No.: 10/399,226

(22) PCT Filed: Oct. 12, 2001

(86) PCT No.: PCT/AT01/00329

§ 371 (c)(1),
(2), (4) Date: Jul. 28, 2003

(87) PCT Pub. No.: WO02/31290

PCT Pub. Date: Apr. 18, 2002

(65) Prior Publication Data

US 2004/0037992 A1 Feb. 26, 2004

(30) Foreign Application Priority Data

Feb. 28, 2001 (AU) ........................................ A 317/2001

(51) Int. Cl.⁷ ................................................ E04C 2/26
(52) U.S. Cl. ............................. 52/390; 52/391; 52/392; 52/506.09; 52/582.1
(58) Field of Search ......................... 52/390, 391, 392, 52/394, 506.09, 763, 582.1, 592.1, 592.2, 747.11; 219/528

(56) References Cited

U.S. PATENT DOCUMENTS 3,344,011 A * 9/1967 Goozner ..................... 428/67
3,367,076 A * 2/1968 O'Brien ....................... 52/394
3,878,030 A * 4/1975 Cook ............................ 428/45
4,386,676 A * 6/1983 Gadde et al. ............... 181/290
4,952,775 A * 8/1990 Yokoyama et al. ......... 219/213
4,998,396 A * 3/1991 Palmersten ................ 52/588.1
5,359,954 A * 11/1994 Kordelin ....................... 114/85
5,363,606 A * 11/1994 Esposito ......................... 52/11
5,937,612 A * 8/1999 Winer et al. ............. 52/747.11
6,343,451 B1 * 2/2002 Chih et al. .................... 52/390
6,536,178 B1 * 3/2003 Pålsson et al. ............... 52/392
6,591,568 B1 * 7/2003 Pålsson ..................... 52/592.2

FOREIGN PATENT DOCUMENTS

DE          3317731       11/1984
DE         19962812        6/2001

* cited by examiner

Primary Examiner—Brian E. Glessner
Assistant Examiner—Basil Katcheves
(74) Attorney, Agent, or Firm—Kolisch Hartwell, P.C.

(57) ABSTRACT

The invention relates to a tile for laying in enclosed spaces, and especially but not exclusively for installation in so-called damp rooms, such as bathrooms, toilets, basements, but also entrance halls, conservatories and verandas. The tile according to the invention is characterized in that it consists of at least one decorative plate and one base plate which is fixed to it by foam or by an adhesive, and in that the base plate recedes behind the contour of the decorative plate(s) on at least one side. The invention may further provide a connecting strip for use between adjacent tiles, or a preferably flat heating element located between the decorative plate and the base plate.

36 Claims, 5 Drawing Sheets

TILE

BACKGROUND

The invention relates to a tile for laying in enclosed spaces. More particularly, the invention relates to tiles used especially but not exclusively for installation in so-called damp rooms, such as bathrooms, toilets, basements, entrance halls, conservatories and verandas.

Such tiles are familiar from DE 76 17 129 U and FR 2 570 116 A, whereby according to both printed publications the base plate and the sole decorative plate have the same shape and size but are arranged at an angle to one another. This results in an overlapping when the tiles are laid that increases mechanical solidity and prevents the formation of steps. Installation is of course still done tile by tile, with attention having to be paid to horizontal adjustment and especially to having the joints between the tiles run straight.

There still do not exist any particular arrangements for minimizing the work and thus the cost of installing tile inside of buildings. As in the past, ceramic tiles are glued to the subfloor, or stone tiles are either also glued to the subfloor, piece by piece, or thin-bed, medium-bed, or thick-bed installation is used. If electric floor heating is planned, the mats or wires respectively are laid on the subfloor surface and subsequently risk being damaged when the floor covering is installed. In any case, the heating elements lie on the subfloor rather than on the floor covering, which greatly reduces the efficiency of the heating system.

For laying tiles in a gravel bed outdoors, it is for instance familiar from AT 403 813 B to glue several ceramic cover tiles or cut stone tiles to a base plate of plastic foam material and to lay this tile in a gravel bed. In one embodiment it is provided that the base plate projects beyond the decorative plates on two sides and that the projection is covered with a water- and frost-proof elastic joint strip in order to preserve the visual impression of individually laid decorative plates.

This tile has essentially proved successful when installed outdoors in a gravel bed, but it does not meet the objective of the above-mentioned use. The reason is that the decorative plates are glued to the base plate, something that is easier to do in production facilities set up for this purpose than at the construction site, but that does not bring an advantage for the tile installation itself. The embodiment with the projecting base plate is visually and mechanically unacceptable because it necessitates masking with an insulating strip.

The invention aims to create a tile for the above-mentioned use that is visually appealing, mechanically solid and economical to produce; in one embodiment it is designed especially to facilitate installation of a heating system and in another embodiment it is designed to be easier to install than tiles familiar so far.

SUMMARY

The invention relates to a tile consisting of a base plate and at least one decorative plate, with the contour of the decorative plate and the base plate differing over at least part of the length of the circumference of the tile.

DETAILED DESCRIPTION

The invention provides a tile having at least one decorative plate that is affixed to a base plate with foam or adhesive, where the base plate recedes behind or projects beyond the decorative plate with at least part of its width and on at least one side, and that on the opposite side either the base plate projects beyond or recedes behind the decorative plate by the same distance, or that the base plate equally recedes behind or projects beyond the decorative plate on the opposite side, so that a connecting strip at least substantially fills the empty space created in this way.

In this way it is possible to lay the decorative plates in the appropriate configuration at the time of manufacture, to fill the remaining space with foam and thus fix the decorative plate to the base plate with foam. Manufacturing the tile in this way results in the precision that is desirable for indoor installation.

By means of the first variant of the invention, which calls for the projection of the base plate—in the case of rectangular tiles—on two adjacent sides and the same projection of the decorative plates on the other two sides, one achieves a flexibility when installing the tile that also allows for adaptation to a certain unevenness of the flooring that is permissible in construction, without detrimental effect to the appearance or mechanical load capacity of the completed floor. In addition, installation and adjustment of the tiles to one another is facilitated.

With the second variant of the invention, which specifies a projection of the decorative plate only, it becomes possible to use connecting strips that lie on or are fixed with adhesive to the substrate and hold and support the tiles, interlocking if necessary, making installation and adjustment of the tiles to one another much easier. Finally, repair is also facilitated by the fact that the connection between the tile and the connecting strip is designed to be reversible or at least easily undone.

Reversing the second variant of the invention, which features a projection solely of the base plate, makes it possible to lay strips between the decorative plates that extend over several tiles, at least in one direction, and thus facilitate adjustment and installation and increase the mechanical solidity of the covering as a whole.

In one embodiment of each of these variants it is possible to give the side edges of the base plate a profile, for instance strip-like projections and groove-like indentations, or else a stepped or angled configuration, whereby on the one hand installation is again made easier and on the other hand the mechanical load capacity is further increased.

A further embodiment of the invention provides for the installation of heating elements, such as heating mats or heating wires or heating tubing, respectively, at the back of the decorative plates, and to fix these when connecting the decorative plates with the base plate, for which purpose corresponding plugs or contacts or fittings are provided at the corresponding edges of the base plates. In the case of the second variant of the invention it is possible to carry the electrical or hydraulic connections or fittings in or over the connecting strips and thus avoid exposed cables, tubing, etc.

Figures 1, 2:
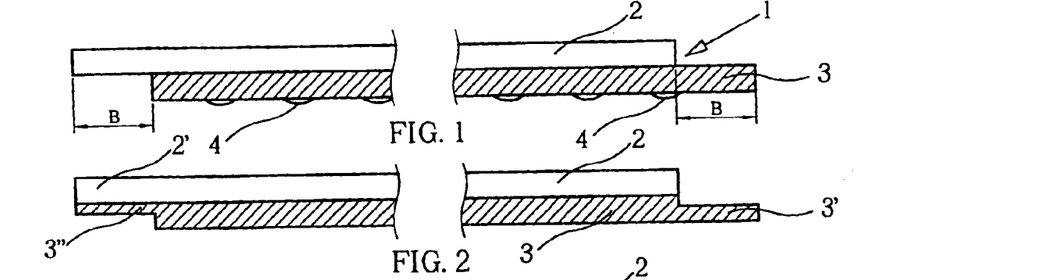
FIG. 1 is a cross-section view of a tile according to an embodiment of the invention.
FIG. 2 is a cross-section view of a tile according to an additional embodiment of the invention.
Figures 5, 6:
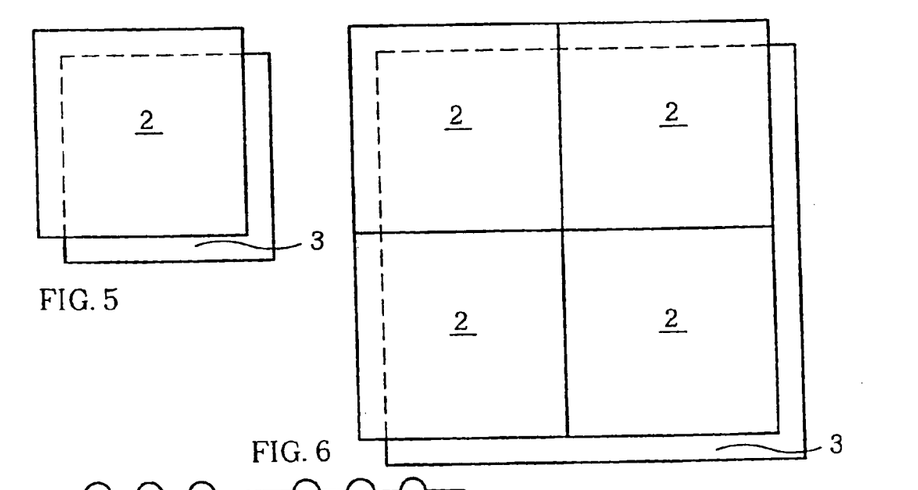
FIG. 5 is a schematic top view of a tile configuration, according to an embodiment of the invention.
FIG. 6 is a schematic top view of a tile configuration, according to an additional embodiment of the invention.
Figure 7:
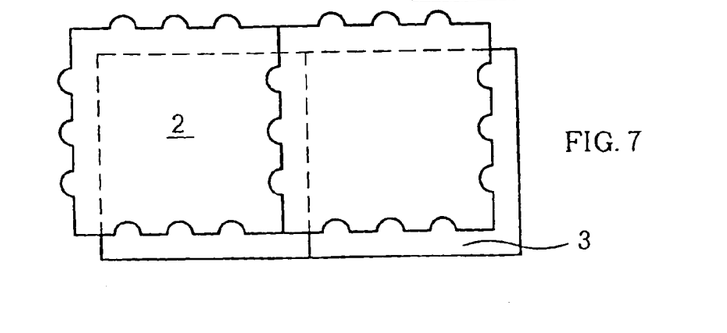
FIG. 7 is a schematic top view of a tile configuration according to an additional embodiment of the invention.
Figure 8:
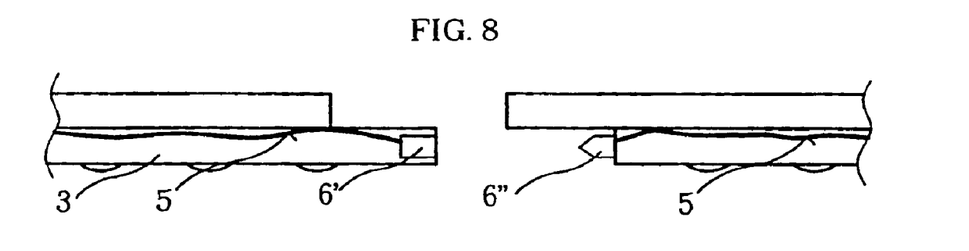
FIG. 8 is a cross-section view of a tile including integral heating elements, according to an embodiment of the invention.
Figure 9:
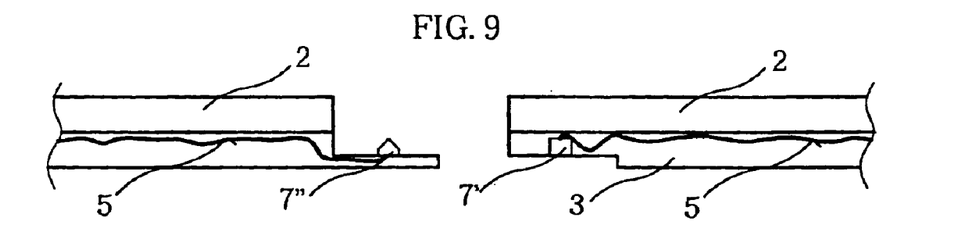
FIG. 9 is a cross-section view of a tile including integral heating elements, according to an additional embodiment of the invention.
Figure 10:
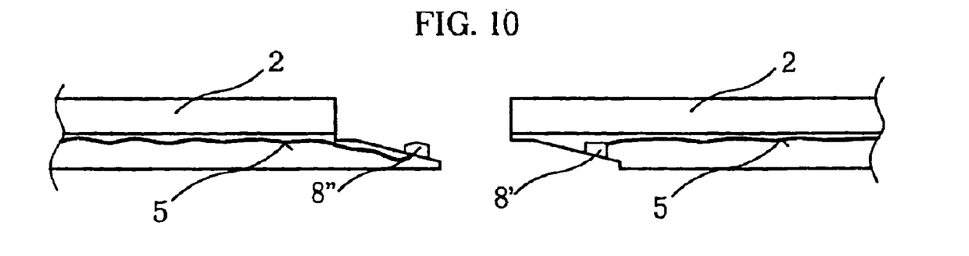
FIG. 10 is a cross-section view of a tile including integral heating elements, according to an additional embodiment of the invention.
Figure 11:
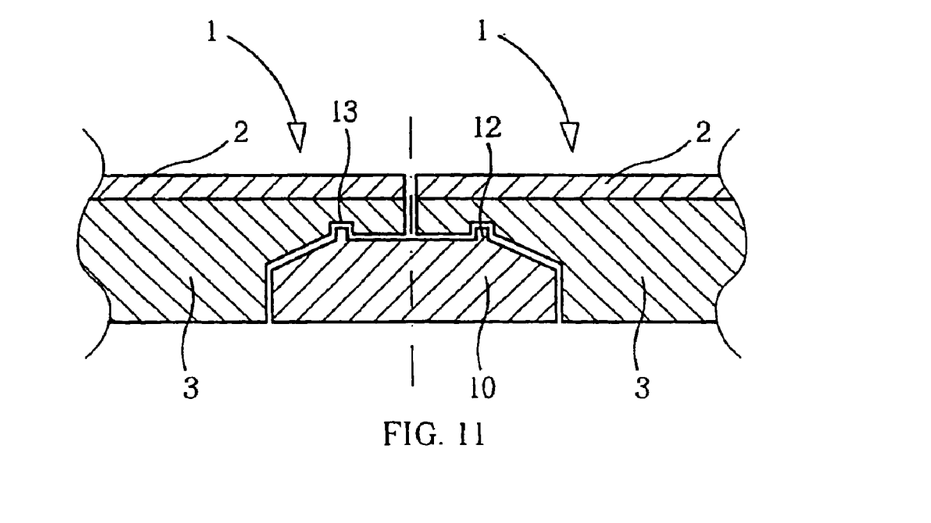
FIG. 11 is a cross-section view of a tile according to an additional embodiment of the invention.

In the following the invention is explained further with the help of the drawing. FIG. 1 shows a cross section of a tile according to the first variant of the invention, FIG. 2 an embodiment, FIGS. 3 and 4 other embodiments, FIGS. 5 to 7 show purely schematic top views of different configurations of tiles, FIGS. 8 to 10 show tiles according to the invention with integral heating elements, FIG. 11 shows a cross section of a tile according to the second variant of the invention, FIG. 12 an embodiment of the third variant of the invention, FIG. 13 a detail of an embodiment of the third variant of the invention, FIGS. 14 and 15 two especially preferred embodiments, and FIG. 16 a further variant of the invention.

FIG. 1 shows a tile according to the invention in cross section. It consists essentially of a decorative plate 2 and a base plate 3. As explained above, base plate 3 is affixed with foam to decorative plate 2, that is to say the connection between the decorative plate and the base plate that is affixed to it with foam is made at the time the base plate is manufactured. Depending on the materials used, it can of course be provided that an additional adhesive is painted or sprayed onto the contact area between the decorative plate 2 and what will become base plate 3, in order to improve or to speed up the attachment of the base plate 3 as it solidifies and takes shape to the back of the decorative plate 2.

FIG. 1 shows that base plate 3 can be provided with nubs 4 on its underside; this equally serves to facilitate installation of tile 1 with tile adhesive or the like.

FIG. 1 also shows that on the right edge in the figure the base plate 3 projects by a width B beyond the edge of decorative plate 2. On the opposite side the decorative plate 2 again projects by the same width B beyond the base plate, so that when the tile is installed edge to edge the joint between the individual tiles 1 does not extend essentially at a right angle to the level of the tile but forms at least a step. This brings with it the above-mentioned advantages for installation and for the load capacity of the tile according to the invention.

FIG. 2 shows a variant of the invention. In it the projecting edge 3' of the tile 3 is thinner than the part of the base plate lying under decorative plate 2; in compensation, in area 2', in which the decorative plate projects beyond the base plate, the base plate has a thin area 3", which in this area corresponds in size to the decorative plate. The respective thicknesses of these base plate areas 3' and 3" respectively are such that their sum yields the same thickness as that of the main area underneath decorative plate 2.

Figures 3, 4:
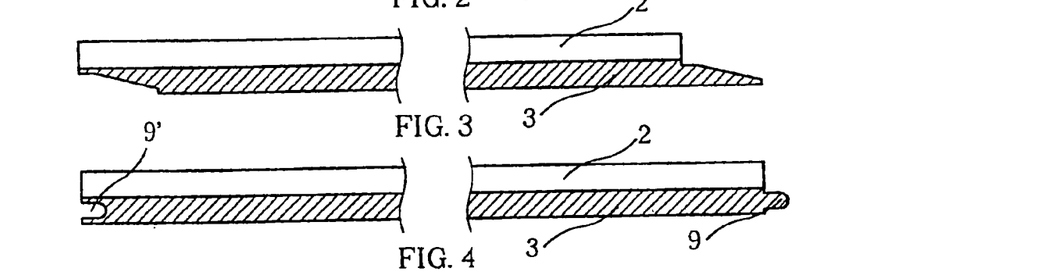
FIG. 3 is a cross-section view of a tile according to an additional embodiment of the invention.
FIG. 4 is a cross-section view of a tile according to an additional embodiment of the invention.

In FIG. 3 a further variant is shown, in which the thickness of the projecting area 3' of the base plate 3 decreases gradually toward the outside and, correspondingly, on the opposite side the base plate 3" located underneath the projecting decorative plate area 2' gradually increases in thickness from the edge inward.

It is of course possible to select a different configuration, as illustrated in FIG. 4, e.g. with an appropriate thickness of the base plate one can select a projection or a recession that approaches the commonly used form of nub 9' and spring 9 or even acquires that particular form.

From FIGS. 5 to 7, which show purely diagrammatic top views of tiles according to the invention, the following configuration results: One sees the displacement of the base plate relative to the decorative plate and perceives as well that it is of course possible (FIG. 6) to combine several decorative plates on one base plate. If the decorative plates do not possess a rectilinearly delimited circumference, as shown in FIG. 7, it is advantageous for installation and handling if the base plates have rectilinear borders.

FIG. 7 also easily shows that it is also possible to manufacture the base plate with nubbed edges. For this purpose one only has to imagine the two tiles turned upside down, i.e. viewed from below: the nubs and notches easily fit into one another and can contribute to an easier installation and adjustment of the covering, especially in the case of large surfaces.

These representations show that in many cases, in order to simplify matters, the base plate will be essentially congruent with the decorative plate(s) and only somewhat displaced, but this is not a requirement.

In order to install the tiles according to the invention, one begins at the edge of the surface to be covered with one of the sides of the tile that has a projecting decorative plate, and one can if necessary fill the area below it with a strip of foam material and the adhesive that is being used, so as to avoid hollow spaces. Then the following tiles are set, in the proper orientation, against the first plate or the first row of such already laid tiles and, if necessary, glued to the substrate, and finally, where this is necessary, the tiles that come to lie at the opposite edge are cut to fit with a saw or a tile cutter or the like and are laid as edging.

For the decorative plates, ceramic materials may be used, or cut stone tiles, artificial stone, wood, aluminum, NIRO, high-grade steel or similar materials; for the base plate, foamed plastics (especially resins) and of those especially polyamide, polyimide, polyurethane and polystyrene (or their resins respectively), but also foamed compounds with cellulose fibers and/or stone fibers. Especially suited are so-called rigid integral foams, rigid elastic foams, Reaction Injection Molding materials and so-called Coating-systems, but also Prepreg-systems and wet-laminated systems. Especially for damp areas materials are preferred that do not absorb water when hardened.

By configuring the tiles according to the invention, it is possible to equip them in a simple and cost-effective manner with an electric or liquid heating system that is also easily and simply installed. For this purpose it is necessary only to provide heating elements (capillary system) in the individual base plates or in the connecting area between the individual base plates and the corresponding decorative plates, and preferably affix them by means of adhesive or foam. These heating elements may be of have a flat surface character, e.g. heating mats that essentially correspond to the surface of the base plates, or they may be of a linear character and take the form of resistance wires or capillary tubes laid in a serpentine or similar pattern.

For the easy installation and connection of the individual heating elements formed in this way, it is only necessary to provide for plugs or fittings in appropriate places on the edges of such tiles, which, preferably, are fitted together as the individual tiles are installed normally.

In FIGS. 8, 9 and 10 such configurations are represented in a purely schematic form, with FIG. 8 showing a configuration of plugs in which the two plugs 6', 6" are essentially pushed horizontally together, corresponding to the way the edges of the adjacent tiles are formed. In FIG. 8 a heating wire 5 and a heating mat, respectively, are shown as well, again purely diagrammatically, ending in a plug 6' or 6" respectively.

In FIG. 9, a tile that essentially corresponds in the configuration of its edge to the tile of FIG. 2 is provided with a plug 7', 7", which connects when the two tiles are pushed toward each other in a vertical direction. This arrangement is possible because the tile shown in FIG. 8 has a base plate that projects, at least at the edge represented in the figure, beyond the decorative plate, even though reduced in thickness, and, at least at the opposite edge, again reduced in thickness, extends as far as the edge of the decorative plate. There are therefore at least two edges at which there are areas of tile 3 where the plugs 7', 7" can be embedded in foam or affixed with adhesive.

FIG. 10 shows a variant that can be selected in the case of slanting edges; this variant shows that a configuration according to the invention is possible regardless of the way the edges are formed.

FIG. 11 shows a diagram of the second variant of the invention in cross-section across a joint of two tiles. In the shown embodiment, decorative plates 2 project on both sides beyond the base plates 3, with the figure showing that a thin area of each base plate extends to the edge of the decorative plate. This serves as mechanical reinforcement, on the one hand, and, on the other hand, it allows for the provision of projections 12 on the connecting strip 10 and of recesses 13 at appropriate points in base plate 3. In this way an exact adjustment of the individual tiles to one another is accomplished in the simplest manner.

The projections 12 can, as pictured, take the form of strips (in which case the recesses then are in the shape of notches), or they may be in the form of cones, truncated cones, or spheres. In these cases they also serve for making adjustments in direction of the longitudinal axis of the connecting strip 10.

In addition to the projections 12 or recesses 13, respectively, it is of course easy to provide for electrical contacts (or fittings for a liquid heating system) in the form of spring-back metal strips, pegs etc., in order to create the electrical connections for an electrical resistance heating system between the decorative plate and the base plate (not shown). If these contacts are in the form of plugs and are sufficiently solid mechanically, they can also take over the function of the projections 12/recesses 13, but in most cases this is not advantageous.

Of course the recesses and, in the thin areas of the base plates, the projections may be provided on the connecting strips 10, without incurring disadvantages. Preferably, the connecting strips 10 may be of a length that extends over several tiles, whereby the mechanical stability and adjustment are further improved. The strips that extend crosswise (if at the other edges the tiles do not end in a blunt edge or according to the first variant of the invention) are proportionately short.

It is also possible to make the connecting strips 10 so high that the tiles no longer rest on the floor but solely on the connecting strips. This is especially useful in the case of an uneven floor unsuited to a surface-covering installation of the tiles. Especially in this case one can also consider making the connecting strips considerably shorter than the side edges of the tiles, thus making contact with the substrate only in discrete points. In this case it is preferred, for reasons of mechanical stability, to arrange the individual connecting strips in the corner area of the tiles. In this case, too, the preferred connecting strips are those in the shape of a cross, that is to say, a connecting strip and the connecting strip that crosses it are formed (preferably) as one piece over a relatively short distance and thus hold four tiles each in their corner areas. In special cases, as for instance when creating a wall covering, it may also be of advantage to form a connecting array of connecting strips and install it as a whole. The array may be a regular grid, particularly a square grid, of connecting strips. In this case what has been said in this description about the connecting strip applies, the necessary changes having been made, for the individual segments of the connecting array.

Another way of connecting the tiles and the connecting strip by way of the projections is to hold the projections in the recesses by springs or by spring-back deformations, so that it is not necessary to create an adhesive connection of the tile with the substrate or the connecting strip respectively.

This facilitates repair of the covering considerably. The projections/recesses may be part of the connecting strip/tile or they may be anchoring pieces inserted into them. In the latter case it is possible to provide that the connection can be undone only by destroying it, and that these anchoring pieces then have to be replaced. In this way one achieves best anchoring strength with only minor increase in costs versus anchoring elements that can be repeatedly detached.

In the FIGS. 7 to 9 the plugs or contacts (fittings) respectively are shown in diagram, and they do not need further explanation since the person skilled in the art in the field of floor heating systems who is familiar with the invention can easily select them from what is offered by the industry. In preferred embodiments it is provided that the plugs that represent the receptacles, 6', 7', 8', have a contact area sufficiently large to accommodate even considerable tilting and imprecision in the position of adjacent tiles to one another that may occur during installation of the tiles, without losing the electrical contact.

In the transition of one row of tiles to the next, connecting cables (connecting pipes) may be used, or, as is preferred, the individual rows of tiles may be individually fed by distribution cables.

With the help of the inventive features, it becomes possible to affix the heating elements directly to the decorative plates (in the drawing, to show it more clearly, this is depicted in an exaggerated wavy fashion and at a distance from the decorative plate), or else to mount them on the thermally insulating foam, whereby the efficiency of the heating system and especially its normal speed is much improved vis-a-vis the prior art.

When manufacturing tiles with heating elements according to the invention, it is possible to first fix these, at least in points, on the tiles lying in the mold in order to ensure correct positioning, and then use foam to attach the base plate or use adhesive to attach a base plate that has already been foam-molded. When prepared base plates are used, it is also possible to affix the heating elements on these and to then glue this prepared unit to the cover tiles; of course it is also possible to simply lay down the heating elements and then, in a single operation, use foam to mold the base plate and connect it with the heating elements and the cover tiles.

Figure 12:
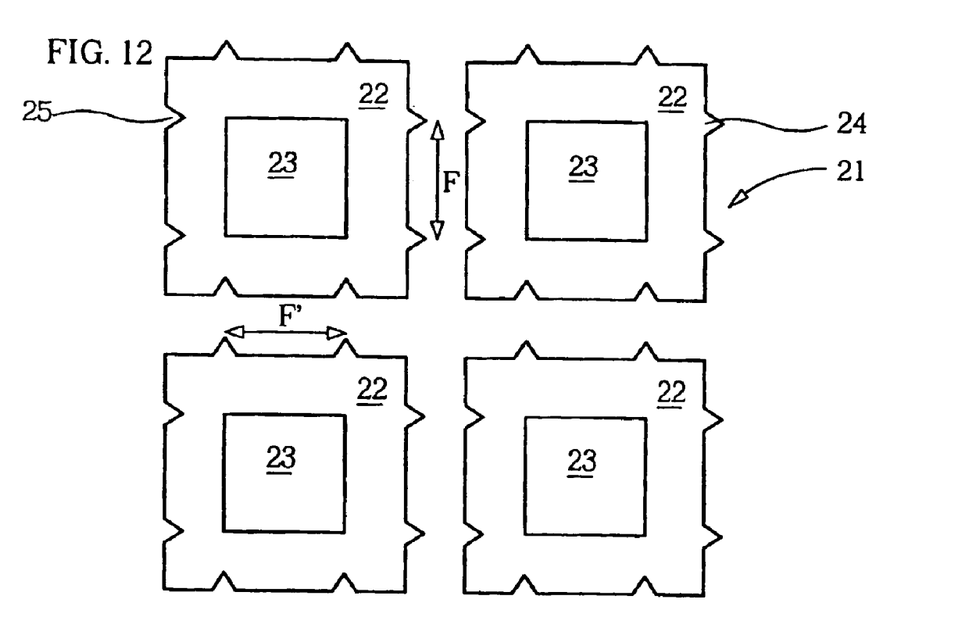
FIG. 12 is a schematic top view of a tile configuration according to another embodiment of the invention.

FIG. 12 shows a diagram of a base plate 22 of a tile 21 according to the invention, which is formed to project on all sides beyond a decorative plate 23. Its side edge is not, however, rectilinear as is usual, but rather has, in the illustrated embodiment, on each side either two triangular projections 24 or two triangular recesses 25. When fitting the tiles 21 together, projections 24 fit into the area of recesses 25, as shown in FIG. 12, and thus also secure the position of adjacent tiles in direction of the double arrows F and F' respectively. In this way one obtains in the problem area, where (using the most common pattern of laying the tile in a square) the four corners of the four adjoining tiles are supposed to meet, if possible, in one point, a visually appealing image without requiring the (until now) complicated installation that can be done only by trained personnel.

Figure 13:
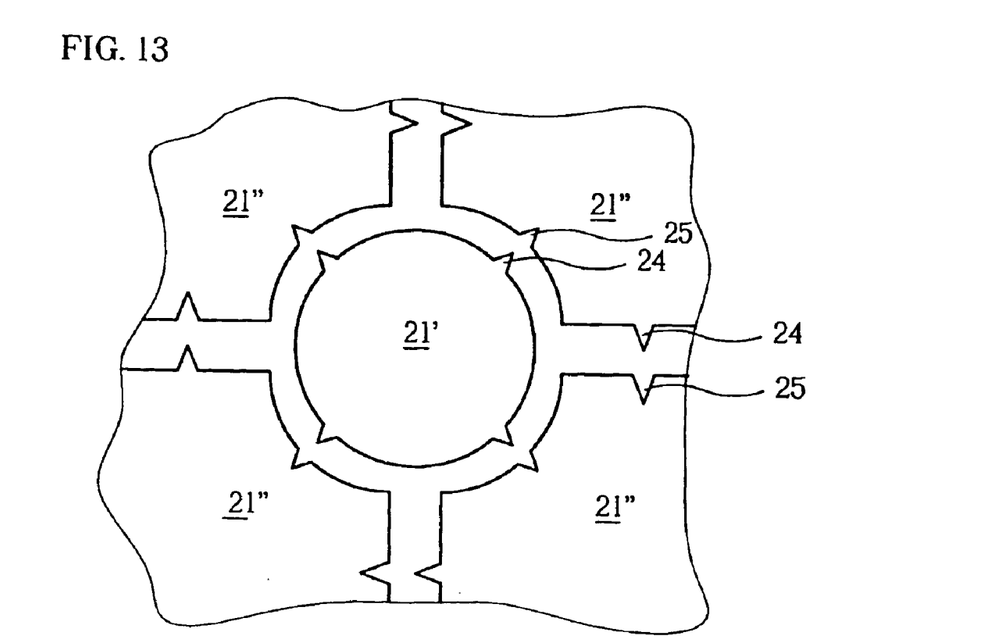
FIG. 13 is a detail of a tile configuration according to another embodiment of the invention.

A variant is shown in FIG. 13, in which, for the sake of simplicity, only the outer contours of the two kinds of tiles 21' and 21" are shown before the final pushing together. As one can see from the drawing, the projections 24 and recessions 25, drawn again as triangles, fit together in such a way that the second kind of tile, shown in the example as a circular disk 21', is laid correctly oriented to the tiles 21" that surround it. In this way it is possible to lay a decoration that may be found on tile 21' with precise angles. Further, the interlocking positioning elements 24, 25 between the tiles 21" assure their correct position to one another, so that tile 21' is laid in an exact circular recess and not, as is often the case in accordance with the prior art, in a recess consisting of four quarter-circle arcs offset to one another.

Of course it is not necessary that the interlocking positioning elements 24, 25 exhibit a triangular cross-section; it is obviously possible to choose here arc-shaped projections or recessions, especially whenever this is more easily done when building the forms in which the corresponding base plates are foam-molded than it would be to shape the angular pieces illustrated in the drawing. Nor was consideration given in the illustration to the formation of curvature radii etc.; the person skilled in the field of tile-laying does not require further explanation to know that provisions for this need to be made.

It is possible, especially when integral foam-molded positioning devices are used, to use these for positioning at a right angle to the level of the tiles as well; for this purpose the height of the positioning elements must match and be limited in order to prevent a vertical displacement of the tiles to one another.

FIGS. 12 and 13 do not show a heating system; this can be easily provided, however, just as with the other illustrated variants.

Figure 14:
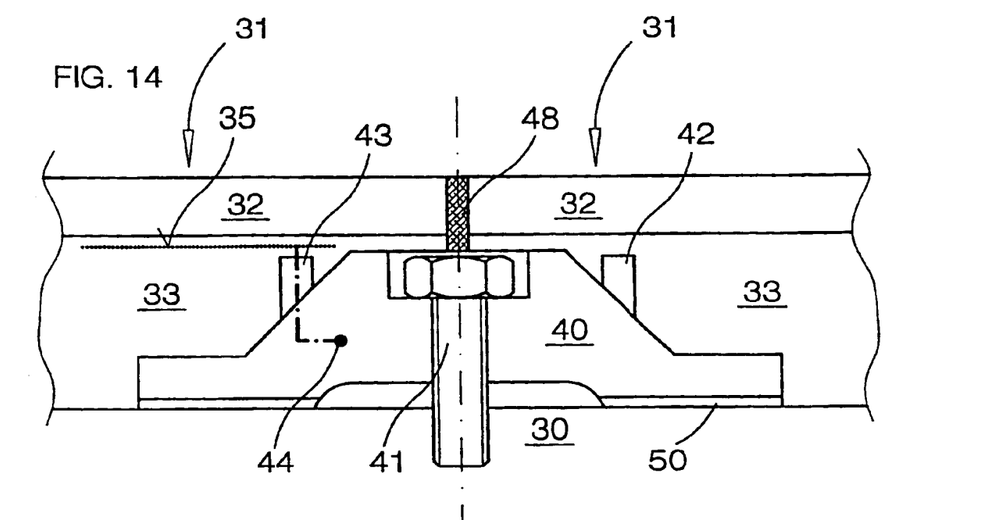
FIG. 14 is a cross-section view of an additional embodiment of the invention.
Figure 15:
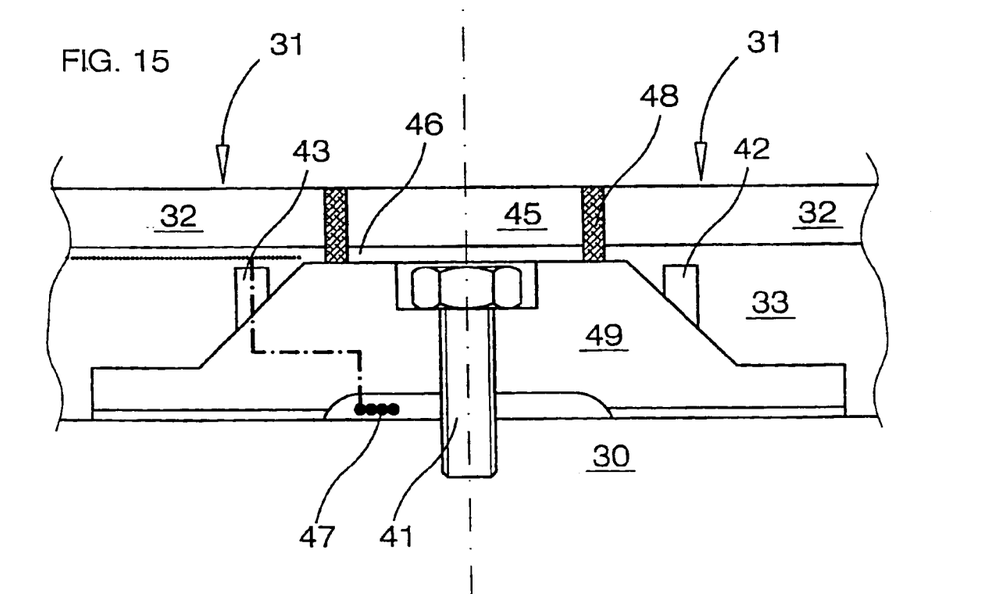
FIG. 15 is a cross-section view of an additional embodiment of the invention.

FIGS. 14 and 15 show especially preferred variants of the invention with which a very simple and yet especially precise installation of the tiles can be accomplished. For this purpose, in the illustrated embodiment, an installation strip 40, 49 is attached to the floor or substrate or subfloor 30, for example by means of the depicted screws 41. The installation strip 40, 49 bears projections 42, 43 and can, if necessary, also have recesses (not shown). The installation strip 40, 49 makes contact with the floor 30 by means of an equalizing layer 50. With the help of this equalizing layer, contact over the whole surface can be achieved, and thus power transmission that is as even as possible. This equalizing layer may consist of a soft material, for instance a felt-like or foam material; it can also be a viscous compound or another material applied separately from the installation strip, even though such a material would only be used in special circumstances because of the additional work and the danger of soiling the surrounding area.

On the floor (30) that has thus been furnished with installation strips 40, 49 in the proper spacing are laid the individual tiles 31. These consist, as in the case of the other embodiments of the invention, of a base-plate 33 and at least one decorative plate 32 per tile. For reasons of simplicity, only one decorative plate 32 is provided for each tile 31 in the illustrated embodiment.

Base plates 33 display recesses that work together with the projections 42, 43 of the installation strip 40 and determine and maintain the position of the tiles 31 with regard to the installation strip 40. For this reason it is not necessary to glue the individual tiles to the floor, piece by piece and precisely aligned, or to attach them in some other appropriate manner, but rather it is possible to fit the tiles 31 on the pre-mounted installation strips 40, 49 and/or in the spaces formed between the installation strips. In this case, the tiles can be glued either to the installation strips 40, 49 or, in the conventional manner of installing tiles, to the floor 30.

As is suggested in the left portion of FIG. 14, it is also possible to use the positioning elements 43 as the plug and/or contact for supplying electrical current to a heating device 35 provided in base plate 33. In this case, the electrical current inside the installation strip 40 can be conducted through one or several cables 44 running lengthwise, as shown in FIG. 14; these cables are linked with the matching contacts of the projections 43. Of course it is also possible to make the contacts independent of the projections 43 in order not to have to create an excessively complicated entity when building the molds for the installation strips 40.

The installation strip 40, 49 may consist of a densely foamed PU-foam or some other synthetic material, preferably one that is similar to that of the base plate; the positioning elements, the projections 42, 43 and/or the recesses (not shown) can be manufactured preferably in a single operation at the time the installation strip 40 is being manufactured; but it is also possible to attach such a piece to an intermediate product and/or to build such a feature into it. To be sure, wood or metal can also be used to manufacture the installation strip 40, 49.

FIG. 15 depicts a variant using a wider installation strip, i.e. installation strip 49. This makes it possible to apply a decorative strip 45 in the area of the decorative plates 45, leading to additional possibilities for a visual design of the surface created by the tiles. In this case, the decorative strip 45 is also provided with a base layer 46 which is, however, greatly reduced by the height of the installation strip 49. Otherwise, the configuration of the tiles and/or the installation strip 40, 49 is the same; as a variant it is only shown that the power supply 47, shown in the left portion of FIG. 15, extends not inside the installation strip itself but rather in a recess in the floor area of the installation strip.

In both FIG. 14 and FIG. 15, a sealing feature 48 is provided at each seam in the surface area, i.e., in the area of the decorative surfaces 32, 45; this sealing feature may consist of a variety of materials and, according to the material used, can be applied at widely varying times. Thus it is possible to produce this sealant by a finishing application of silicon rubber, or a separate band could be used as a sealant which is correspondingly compressed and squeezed while laying tiles 31 and/or decorative strip 45 in order to deploy its sealing effect. Of course it is also possible, especially with regard to the embodiment shown in FIG. 15, to affix sealant 48 to the decorative strip 45, simplifying handling. It goes without saying that all other measures familiar in the area of sealing techniques for use on floors and wall coverings may also be used. In the direction perpendicular to the longitudinal direction of the installation strips 40, 49 it is possible to use short cross strips that are laid individually; thanks to the adequate positioning by way of installation strips 40, 49, the short cross strips can be limited to a base- and support function around the edges of the tiles and for this reason do not have to be laid with as much precision as the installation strips 40, 49. However, tiles can also be used that are equipped on only two opposite edges with a configuration of base plate 33 as shown in FIGS. 14 and 15, and which have a straight edge on the other two opposite sides, so that it is not necessary to provide cross strips. To be sure, it is also possible to provide the installation strips 40, 49 with adjustment elements for the cross strips, so that laying of the cross strips can be done with high precision and yet without complex logistics. All these details and variants are easily executable for the person skilled in the area of tile laying and with knowledge of the invention.

Figure 16:
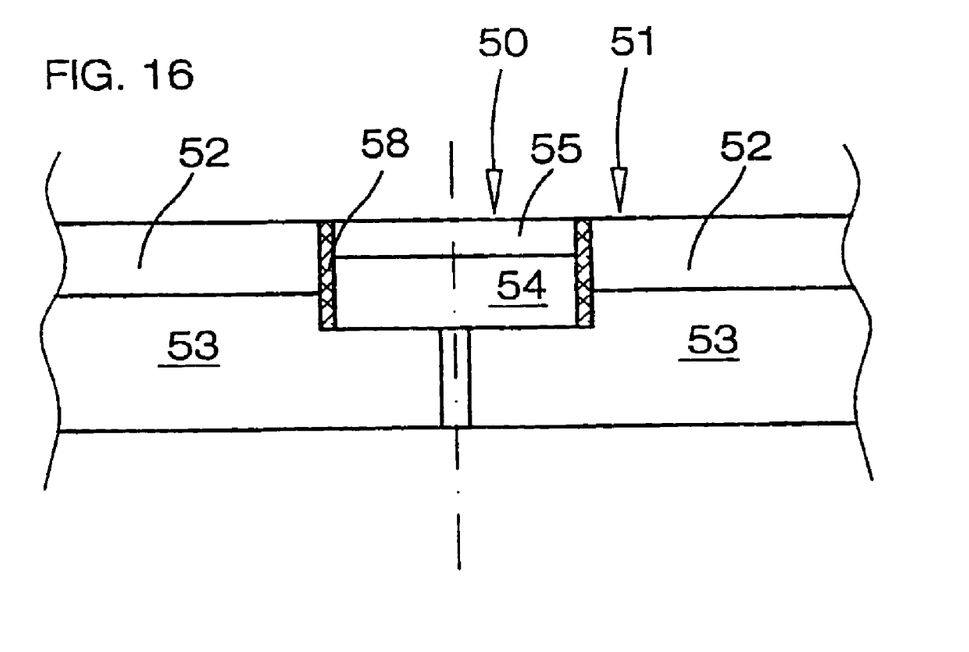
FIG. 16 is a cross-section view of an additional embodiment of the invention.

FIG. 16 shows the reverse of the situation in FIG. 11, as it were, whereby this purely diagrammatic representation dispenses with details like heating and the projections/recesses that serve to adjust the tiles: the base plates 53 of tiles 51 touch one another, the edges of decorative plates 52 that are adjacent to the seam recede and create space for a decorative strip 50, which consists in turn of a base strip 54 and a decorative strip 55. Here, too, a connection of the individual parts can be provided for by corresponding projections/recesses, the connection of the heating elements in the individual tiles can be made with plugs/contacts/fittings between the strip and the tiles, a sealing feature 58 can be provided for in the area of the joint, and all the other features and elements discussed with regard to the other embodiments may be present.

A possible special feature is the mounting of sound-absorbing particles, for example steel particles, on the side of the decorative plate turned toward the base plate, for example by means of screen printing. It is also possible to apply the particles to a film or another thin layer, and then to glue, or bond in some other way, this layer to the decorative plate. In this case the particles are applied preferably in special patterns, which the person skilled in the field of foot-traffic soundproofing and with knowledge of this invention can easily select, for example in curved lines extending from corner to corner, say, and with parallel-running lines along the edge side, with the central area of the tile remaining essentially free.

This applies as well, for the person skilled in the field of electrical floor heating, to the design of the plugs or electric contacts, the arrangement of the flat heating element 35, and the applicable voltage and amperage. With the use of a liquid heating system, it is an easy task for the person skilled in the field and with knowledge of the invention to decide on and prepare the small pipes or elements to be embedded in the foam and to prepare them ahead of installation. With knowledge of the invention the fittings can also be easily selected and added to the mold as needed, to be affixed with foam. The present invention makes possible the use of all these features and components familiar from the prior art, which exhibit inventive attributes only in regard to the configuration of the tiles according to the invention.

The invention can be modified in various ways. Thus it is possible to dispense with the nubs 4 shown in FIG. 1, or else to give them the form of strips or of larger projecting surfaces; it is also possible to make these nubs or strips higher or lower than depicted. The invention was explained using the example of rectangular tiles, but in special cases it is entirely possible to use other polygonal shapes as well, and even shapes that are bordered by segments of circles and/or other lines. In these cases, instead of the side on which the base plates project and/or recede, corresponding sections are to be used, something that is easy to do for the person skilled in the art with knowledge of the invention.

The size of the tiles depends essentially on their manageability and their suitability for installation on the usual substrates, and of course also on the shape and size of the surface to be covered, and it can approach the range of a square meter or somewhat more, even though sizes are preferred that, depending on the decorative plates used, can be managed without problem by one person.

It is of course possible to equip the base plate with a reinforcement during its manufacture in order to increase its mechanical strength. For this purpose, different mats, nets, or reinforcement elements (fiberglass or such) embedded in the mass of the foamed plate can be used.

In the drawing, the heating elements are depicted as placed in the uppermost area of the base plate, but in the claims they are defined as lying between the base plate and the decorative plate. The reason for that lies in the preferred method of manufacture, by which the decorative plate is laid in a form first, the heating element is laid on top of it, and then foam is used to fix everything together. During this process the heating element moves partially into the uppermost area of the base plate but remains partially in the border area. For depiction in the drawing, the first variant is better suited and was therefore chosen.

There is frequent mention in the Claims and the Description of the "contour" of the base plate, without detailing in particular that the edge of the base plate usually has a profile and, for mechanical reasons, usually extends with a thin area all the way to the edge of the decorative plate. It is not this thin part of the base plate, which only protects the edge of the decorative plate, that is referred to when the contour of the base plate is being defined, but rather the part that essentially absorbs the mechanical stress.

Although the present invention has been shown and described with reference to the foregoing operational principles and preferred embodiments, it will be apparent to those skilled in the art that various changes in form and detail may be made without departing from the spirit and scope of the invention. The present invention is intended to embrace all such alternatives, modifications and variances that fall within the scope of the appended claims.

We claim:

1. A tile system comprising a tile and a connecting strip, the tile having at least one decorative plate and at least one base plate affixed to the decorative plate with foam or adhesive, such that the base plate recedes behind or projects beyond the contour of the decorative plate on at least one side; and the base plate also recedes behind or projects beyond the contour of the decorative plate, such that the connecting strip at least substantially fills the resulting space between adjacent tiles, wherein the tile includes positioning elements selected from recesses and projections and the connecting strip includes positioning elements that correspond to the tile positioning elements, the positioning elements having a form selected from the group consisting of cones, truncated cones and spheres.

2. The tile system of claim 1, wherein a side edge of the base plate has a profile.

3. The tile system of claim 2, wherein the side edge of the base plate is slanted or stepped.

4. The tile system of claim 1, further comprising a heating element mounted between the decorative plate and the base plate.

5. The tile system of claim 4, wherein the heating element includes an electric heating mat or a liquid heating element.

6. The tile system of claim 4, further comprising plugs or fittings for the heating element, where the plugs or fittings are mounted at corresponding edges of adjacent base plates or at corresponding edges of base plates and adjacent connecting strips.

7. The tile system of claim 1, wherein the edges of the base plates are provided with interlocking positioning elements.

8. The tile system of claim 1, where the positioning elements are formed as separate parts and then affixed to the base plate.

9. The tile system of claim 1, where the positioning elements are formed as independent parts and then detachably connected to the base plate.

10. The tile system of claim 1, where the positioning elements are formed by the shape of the base plate.

11. The tile system of claim 1, where positioning elements that are oriented perpendicular to the plane of the tile have a variable cross-section.

12. The tile system of claim 1, where the positioning elements of the base plate and the corresponding positioning elements of the connecting strip are resilient and may be fitted together by elastic deformation.

13. The tile system of claim 1, wherein the positioning elements of the base plate and the corresponding positioning elements of the connecting strip are resilient and may be separated from one another by elastic deformation.

14. The tile system of claim 1, where the positioning elements of the base plate and the corresponding positioning elements of the connecting strip may be separated from one another by plastic deformation.

15. The tile system of claim 1, wherein the base plate comprises a foamed plastic.

16. The tile system of claim 15, where the foamed plastic includes cellulose fibers or stone fibers.

17. The tile system of claim 15, where the foamed plastic is a polyamide, a polyimide, a polyurethane, or a polystyrene.

18. The tile system of claim 15, where the base plate includes one or more of rigid integral foams, rigid elastic foams, Reaction Injection Molding materials, Coating-Systems materials, Prepreg-systems materials, and wet-laminated systems materials.

19. The tile system of claim 1, where a sealing feature is provided in the area where two plates meet.

20. The tile system of claim 19, where the sealing feature is provided at an edge.

21. The tile system of claim 1, where at least one decorative plate is provided with a sound-absorbing medium on the surface that faces the base plate, for the purpose of absorbing resonance.

22. The tile system of claim 21, where the sound-absorbing medium includes particles.

23. The tile system of claim 21, where the sound-absorbing medium has a density of more than 2500 kg/m3.

24. The tile system of claim 21, where the sound-absorbing medium has an average density that is at least twice the average density of the base plate.

25. The tile system of claim 21, where the sound-absorbing medium includes metal.

26. The tile system of claim 1, wherein the tile has a side edge having an edge length and the connecting strip has a strip length that is substantially shorter than the edge length.

27. The tile system of claim 26, wherein the connecting strip has the shape of a cross and is adapted to connect each of four tiles at their corners.

28. A tile system comprising tiles and a connecting strip for interposing between tiles, where each tile comprises at least one decorative plate and at least one base plate affixed to the decorative plate with foam or adhesive, such that the base plate recedes behind or projects beyond the contour of the decorative plate on at least one side and on an opposite side the base plate also recedes behind or projects beyond the contour of the decorative plate, and where each tile includes positioning elements, where the connecting strip is configured to at least substantially fill the resulting space between adjacent tiles and includes positioning elements corresponding to the positioning elements of the tiles, where the positioning elements include cones, truncated cones, or spheres.

29. The tile system of claim 28, further comprising electrical contacts, connections, or fittings configured to supply an electrical current or a heating medium to electrical or hydraulic heating elements associated with the tiles.

30. The tile system of claim 28, where the connecting strip has a length greater than the edge length of the individual tiles.

31. The tile system of claim 30, where the connecting strip has a length that is a multiple of the edge length of the individual tiles.

32. The tile system of claim 28, where the positioning elements are formed as independent parts and are detachably connected to the connecting strip.

33. The tile system of claim 28, where the positioning elements are formed by the shape of the connecting strip.

34. The tile system of claim 28, further comprising a plurality of segments of additional connecting strips to form a connecting array.

35. The tile system of claim 34, where the connecting array has the form of a grid.

36. A tile system comprising tiles and a connecting strip for interposing between tiles, where each tile comprises at least one decorative plate and at least one base plate affixed to the decorative plate with foam or adhesive, such that the base plate recedes behind or projects beyond the contour of the decorative plate on at least one side and on an opposite side the base plate also recedes behind or projects beyond the contour of the decorative plate, where the tiles include positioning elements, and where the connecting strip is configured to at least substantially fill the resulting space between adjacent tiles and includes positioning elements corresponding to the positioning elements of the tiles, where the positioning elements are formed as independent parts and are affixed to the connecting strip with foam.

* * * * *